US012771160B2

(12) United States Patent
Nishimoto et al.

(10) Patent No.: US 12,771,160 B2
(45) Date of Patent: Oct. 20, 2026

(54) PULSE EXTRACTION DEVICE, PULSE EXTRACTION METHOD, AND PROGRAM

(71) Applicant: HONDA MOTOR CO., LTD., Tokyo (JP)

(72) Inventors: Yurika Nishimoto, Wako (JP); Tadashi Kaga, Wako (JP); Naoya Aida, Wako (JP); Yuki Tominaga, Wako (JP); Hikaru Arai, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 800 days.

(21) Appl. No.: 18/113,103

(22) Filed: Feb. 23, 2023

(65) Prior Publication Data

US 2023/0318339 A1 Oct. 5, 2023

(30) Foreign Application Priority Data

Mar. 10, 2022 (JP) ................................ 2022-037061

(51) Int. Cl.
*H02J 7/90* (2026.01)
*H02J 7/40* (2026.01)
*H02J 7/84* (2026.01)

(52) U.S. Cl.
CPC ................ *H02J 7/927* (2026.01); *H02J 7/40* (2026.01); *H02J 7/84* (2026.01)

(58) Field of Classification Search
CPC .... H02J 7/00711; H02J 7/00032; H02J 7/005; Y02E 60/10; H01M 10/42; H01M 10/4285; B60K 1/04; B60L 50/66; B60L 58/12; G01R 31/367; G01R 31/382; G01R 31/392
See application file for complete search history.

(56) References Cited

U.S. PATENT DOCUMENTS

| | | | | |
|---|---|---|---|---|
| 11,163,010 | B2 * | 11/2021 | Iwane | H02J 7/005 |
| 11,422,194 | B2 * | 8/2022 | Oyama | G01R 31/388 |
| 2013/0241567 | A1 | 9/2013 | Boehm et al. | |
| 2020/0057113 | A1 | 2/2020 | Ukumori | |
| 2021/0382114 | A1 | 12/2021 | Oyama et al. | |

(Continued)

FOREIGN PATENT DOCUMENTS

| | | |
|---|---|---|
| CN | 103487788 | 1/2014 |
| CN | 110703118 | 1/2020 |
| DE | 102013209453 | 11/2014 |

(Continued)

OTHER PUBLICATIONS

Japanese Office Action for Japanese Patent Application No. 2022-037061 mailed Oct. 3, 2023.

(Continued)

*Primary Examiner* — Lee E Rodak
*Assistant Examiner* — Byung Ro Lee
(74) *Attorney, Agent, or Firm* — Amin, Turocy & Watson, LLP

(57) ABSTRACT

A pulse extraction device that can finely divide a waveform representing the charge amount (SOC) is provided. A pulse extraction device includes a pulse extraction part configured to extract a pulse based on a change point at which an increase or decrease changes in time series data of a charge amount of a secondary battery.

10 Claims, 6 Drawing Sheets

(56) References Cited

U.S. PATENT DOCUMENTS

2022/0373608 A1 11/2022 Takehana et al.

FOREIGN PATENT DOCUMENTS

| | | |
|---|---|---|
| EP | 3875974 | 9/2021 |
| JP | 2013-537620 | 10/2013 |
| JP | 2014-163875 | 9/2014 |
| JP | 2018-169393 | 11/2018 |
| JP | 2021-057245 | 4/2021 |
| JP | 2021-058017 | 4/2021 |
| WO | 2020/090143 | 5/2020 |

OTHER PUBLICATIONS

Chinese Office Action for Chinese Patent Application No. 202310102186.0 mailed Jun. 10, 2026.
Fan Fuhua, “A method of extracting singular pulse from received pulse series based on outlier analysis”, vol. 26, No. 5, 2010.
Harrington, RC et al., “Exploiting SEU Data Analysis to Extract Fast SET Pulses”, IEEE Transactions On Nuclear Science, vol. 66, No. 6, Jun. 2019.

* cited by examiner

FIG. 6

| SEGMENT NO. | PULSE | ΔSOC | MEDIAN SOC | CURRENT DURING CHARGING | CURRENT DURING DISCHARGE | TEMPERATURE |
|---|---|---|---|---|---|---|
| 1ST | LARGE | | | | | |
| | SMALL | | | | | |
| | SMALL | | | | | |
| 2ND | LARGE | | | | | |
| | SMALL | | | | | |
| | SMALL | | | | | |
| ⋮ | ⋮ | ⋮ | ⋮ | ⋮ | ⋮ | ⋮ |

PULSE EXTRACTION DEVICE, PULSE EXTRACTION METHOD, AND PROGRAM

CROSS-REFERENCE TO RELATED APPLICATION

Priority is claimed on Japanese Patent Application No. 2022-037061, filed Mar. 10, 2022, the content of which is incorporated herein by reference.

BACKGROUND OF THE INVENTION

Field of the Invention

The present invention relates to a pulse extraction device, a pulse extraction method, and a program.

Description of Related Art

There is a technology for calculating a moving average from a waveform representing a measured state of charge (SOC; hereinafter also referred to as a "battery charging rate") of a battery and estimating the deterioration conditions of the battery (for example, Patent Document 1 (Published Japanese Translation No. 2013-537620 of the PCT International Publication), Patent Document 2 (Japanese Unexamined Patent Application, First Publication No. 2014-163875), and the like).

SUMMARY OF THE INVENTION

However, the conventional technology has low estimation accuracy. The present invention has been made in consideration of such circumstances, and one object thereof is to finely divide a waveform representing an SOC. In addition, it is possible to improve energy efficiency by accurately calculating the characteristic values of a battery using the finely divided waveform.

The pulse extraction device, the pulse extraction method, and the program according to the present invention has adopted the following configuration.

(1): A pulse extraction device according to one aspect of the present invention includes a pulse extraction part configured to extract a pulse based on a change point at which an increase or decrease changes in time series data of a charge amount of a secondary battery.

(2): In the aspect of (1) described above, the pulse extraction device further includes a segmentation part configured to divide the time series data for each segment based on a reference value of the charge amount, in which the pulse extraction part extracts a pulse for each segment.

(3): In the aspect of (1) or (2) described above, the pulse extraction device further includes a pulse characteristic value calculation part configured to calculate pulse characteristic values based on the extracted pulse.

(4): In the aspect of (3) described above, the pulse characteristic values include a current value during charging of the secondary battery, a current value during discharging, an amount of change in charge amount, and a median value of the charge amount.

(5): A pulse extraction method according to another aspect of the present invention includes a pulse extraction step of extracting a pulse based on a change point at which an increase or decrease changes in time series data of a charge amount of a secondary battery.

(6): A program according to still another aspect of the present invention causes a computer to extract a pulse based on a change point at which an increase or decrease changes in time series data of a charge amount of a secondary battery.

According to the aspects of (1), (5), and (6), it is possible to finely divide a waveform representing the charge amount.

According to the aspect of (2), it is possible to more finely divide a waveform representing the charge amount.

According to the aspects of (3) and (4), it is possible to calculate characteristics of the battery based on a waveform representing the charge amount.

BRIEF DESCRIPTION OF THE DRAWINGS

FIG. 6 is an example of a table which shows pulse characteristic values.

DETAILED DESCRIPTION OF THE INVENTION

Hereinafter, embodiments of a pulse extraction device, a pulse extraction method, and a program of the present invention will be described with reference to the drawings.

[Configuration of Vehicle]

Figure 1:
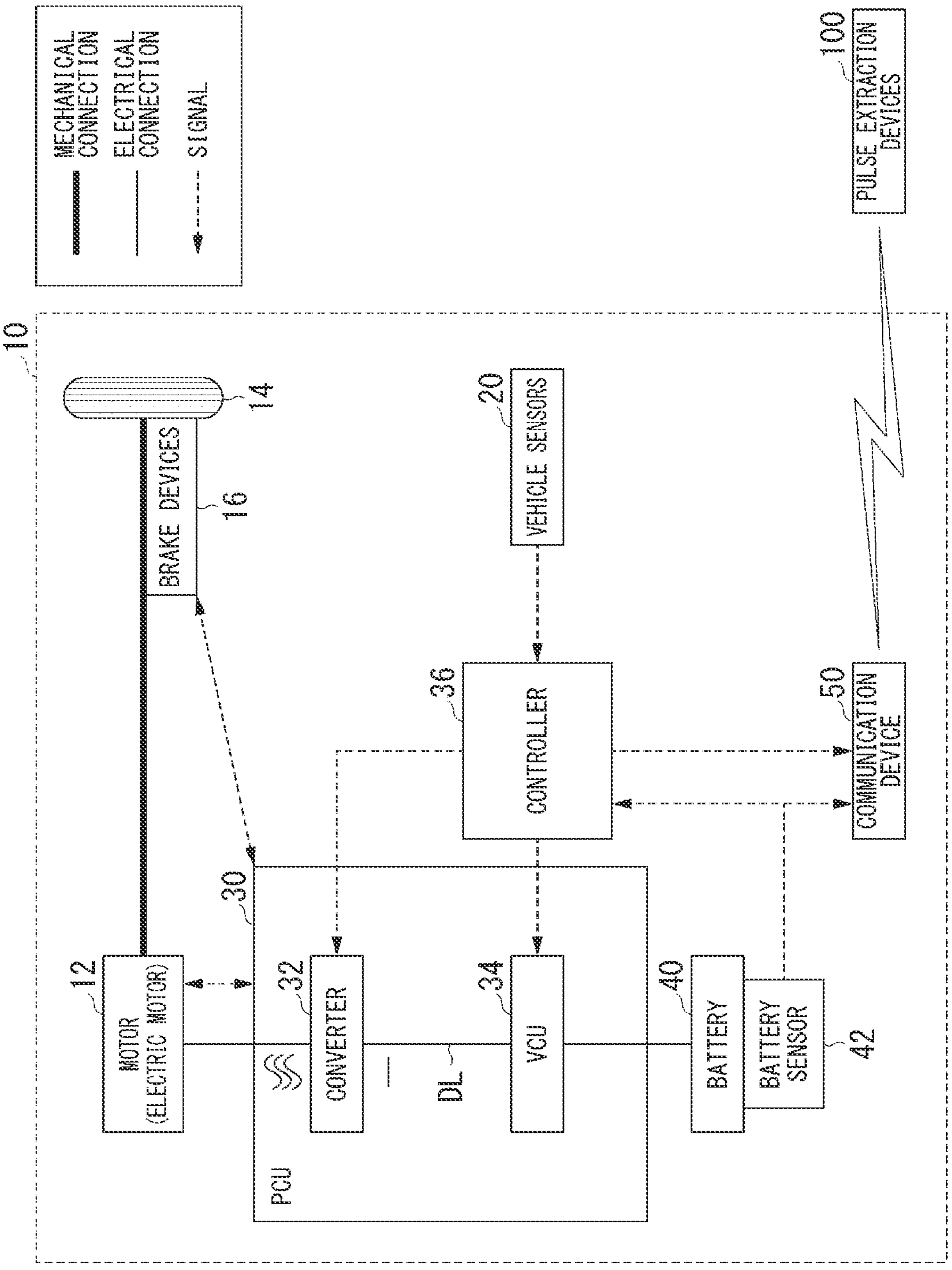
FIG. 1 is a diagram which shows an example of a configuration of a vehicle 10 to which a pulse extraction device 100 according to an embodiment is applied.

FIG. 1 is a diagram which shows an example of a configuration of a vehicle 10 to which a pulse extraction device 100 according to an embodiment is applied. The vehicle 10 shown in FIG. 1 is a battery electric vehicle (BEV) that travels by an electric motor that is driven by electric power supplied from a battery (secondary battery) for traveling. Alternatively, the vehicle 10 may be a plug-in hybrid vehicle (PHV) or a plug-in hybrid electric vehicle (PHEV) in which a hybrid vehicle has an external charging function. Examples of the vehicle 10 include not only a four-wheeled vehicle, but also a saddle-type two-wheeled vehicle, a three-wheeled vehicle (including a vehicle with two front wheels and one rear wheel as well as a vehicle with one front wheel and two rear wheels), an assist-type bicycle, and furthermore, all types of mobile objects that travel by an electric motor driven by electric power supplied from a battery such as an electric boat.

The motor 12 is, for example, a three-phase AC motor. A rotor of the motor 12 is connected to a drive wheel 14. The motor 12 is driven by electric power supplied from a power storage part (not shown) included in the battery 40 and transmits rotational power to the drive wheel 14. The motor 12 generates electricity using kinetic energy of the vehicle 10 when the vehicle 10 decelerates.

The brake device 16 includes, for example, a brake caliper, a cylinder that transmits hydraulic pressure to the brake caliper, and an electric motor that generates hydraulic pressure to the cylinder. The brake device 16 may have a mechanism that transmits hydraulic pressure generated by an operation of a user (driver) of the vehicle 10 with respect to a brake pedal (not shown) to the cylinder via a master cylinder as a backup. The brake device 16 is not limited to the configuration described above, and may be an electronically controlled hydraulic brake device that transmits the hydraulic pressure of the master cylinder to the cylinder.

The vehicle sensor 20 includes, for example, an accelerator opening sensor, a vehicle speed sensor, and a brake depression amount sensor. The accelerator opening sensor is attached to an accelerator pedal, detects an operation amount of the accelerator pedal by the driver, and outputs the detected operation amount as accelerator opening to a controller 36, which will be described below. The vehicle speed sensor includes, for example, a speed calculator and a vehicle wheel speed sensor attached to each wheel of the vehicle 10, derives a speed (vehicle speed) of the vehicle 10 by integrating the vehicle wheel speeds detected by the vehicle wheel speed sensor, and outputs it to the controller 36. The brake depression amount sensor is attached to a brake pedal, detects an operation amount of the brake pedal by the driver, and outputs the detected operation amount to the controller 36 as a brake depression amount.

A PCU 30 includes, for example, a converter 32 and a voltage control unit (VCU) 34. In FIG. 1, it is only an example that these components are configured to be one unit as the PCU 30, and these components in the vehicle 10 may be disposed in a distributed manner.

The converter 32 is, for example, an AC-DC converter. A DC side terminal of the converter 32 is connected to a DC link DL. The battery 40 is connected to the DC link DL via a VCU 34. The converter 32 converts an alternating current generated by the motor 12 into a direct current and outputs the direct current to the direct current link DL.

The VCU 34 is, for example, a DC-DC converter. The VCU 34 boosts the electric power supplied from the battery 40 and outputs it to the DC link DL.

The controller 36 controls driving of the motor 12 based on an output from the accelerator opening sensor provided in the vehicle sensor 20. The controller 36 controls the brake device 16 based on an output from the brake depression amount sensor provided in the vehicle sensor 20. The controller 36 calculates, for example, an SOC of the battery 40 based on the output from a battery sensor 42 to be described below, which is connected to the battery 40, and outputs it to the VCU 34. The SOC of the battery 40 is calculated, for example, based on a function of a voltage and SOC, and a voltage detected by the battery sensor 42. The SOC of the battery 40 is calculated, for example, based on a function of a voltage, a current, a temperature, and the SOC, as well as a voltage, a current, and a temperature detected by the battery sensor 42. The VCU 34 raises a voltage of the DC link DL according to an instruction from the controller 36.

The battery 40 is, for example, a secondary battery that can be repeatedly charged and discharged, such as a lithium ion battery. A positive electrode active substance constituting a positive electrode of the battery 40 is, for example, a substance containing at least one of materials such as nickel cobalt manganese (NCM), nickel cobalt aluminum (NCA), lithium ferrophosphate (LFP), and lithium manganese oxide (LMO). A negative electrode active substance constituting a negative electrode of the battery 40 is, for example, a substance containing at least one of materials such as hard carbon and graphite. The battery 40 may be, for example, a cassette-type battery pack that is detachably attached to the vehicle 10. The battery 40 stores electric power supplied from an external charger (not shown) of the vehicle 10 and discharges the electric power for traveling of the vehicle 10.

The battery sensor 42 detects physical quantities such as a current, a voltage, and a temperature of the battery 40. The battery sensor 42 includes, for example, a current sensor, a voltage sensor, and a temperature sensor. The battery sensor 42 detects a current of a secondary battery (hereinafter simply referred to as the "battery 40") that constitutes the battery 40 with a current sensor, detects the voltage of the battery 40 with a voltage sensor, and detects the temperature of the battery 40 with a temperature sensor. The battery sensor 42 outputs physical quantity data such as the detected current value, voltage value, and temperature of the battery 40 to the controller 36 and a communication device 50.

The communication device 50 includes a wireless module for connecting to a cellular network or a Wi-Fi network. The communication device 50 may include a wireless module for use with Bluetooth (registered trademark) or the like. The communication device 50 transmits or receives various types of information related to the vehicle 10 to or from, for example, the pulse extraction device 100 through communication in the wireless module. The communication device 50 transmits the physical quantity data of the battery 40 output by the controller 36 or the battery sensor 42 to the pulse extraction device 100. The communication device 50 may receive information representing the characteristics of the battery 40 diagnosed and transmitted by the pulse extraction device 100 to be described below, and output the received information representing the characteristics of the battery 40 to an HMI (not shown) of the vehicle 10.

[Configuration of Pulse Extraction Device]

Figure 2:
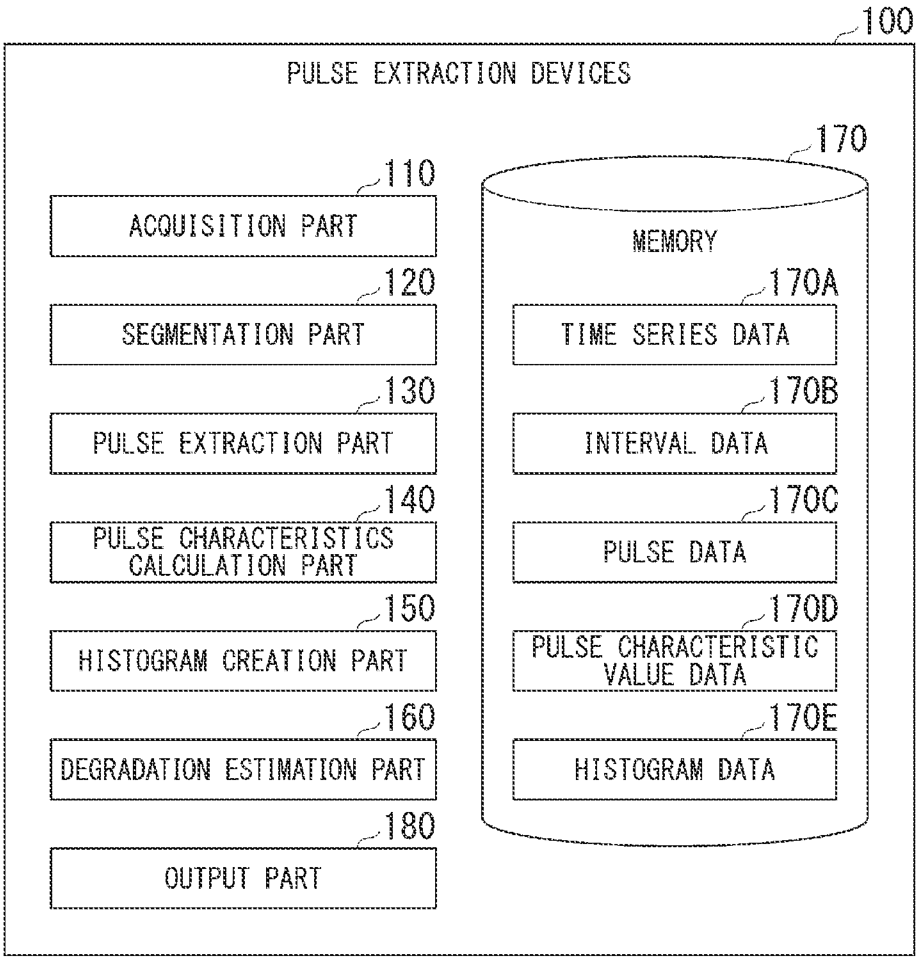
FIG. 2 is a diagram which shows an example of a configuration of the pulse extraction device 100 according to the embodiment.

Next, an example of the pulse extraction device 100 that extracts a pulse from a waveform representing changes in the SOC of the battery 40 of the vehicle 10 will be described. FIG. 2 is a diagram which shows an example of a configuration of the pulse extraction device 100 according to the embodiment. The pulse extraction device 100 includes, for example, an acquisition part 110, a segmentation part 120, a pulse extraction part 130, a pulse characteristic value calculation part 140, a histogram creation part 150, a degradation estimation part 160, and a storage part 170. These components are realized by a hardware processor such as a central processing unit (CPU) executing a program (software). Some or all of these components may be realized by hardware (circuit unit; including circuitry) such as large scale integration (LSI), an application specific integrated circuit (ASIC), a field-programmable gate array (FPGA), and a graphics processing unit (GPU) or may also be realized by software and hardware in cooperation. The program may be stored in advance in a storage device (a storage device including a non-transitory storage medium) such as a hard disk drive (HDD) or flash memory, or may be stored in a removable storage medium such as a DVD or CD-ROM and installed by the storage medium being attached to a drive device. The storage part 170 is, for example, an HDD, a flash memory, a random access memory (RAM), or the like. The storage part 170 stores, for example, time series data 170A, segment data 170B, pulse data 170C, pulse characteristic value data 170D, and histogram data 170E.

Figure 3:
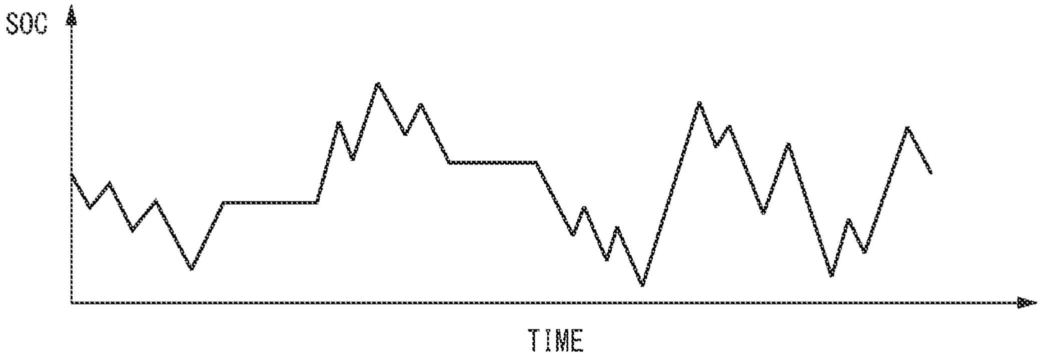
FIG. 3 is an example of time series data of an SOC.

The acquisition part 110 acquires time series data of at least the SOC of the battery 40 from the communication device 50 using a communication interface (not shown) mounted on the pulse extraction device 100, and stores it in the storage part 170 as the time series data 170A. The acquisition part 110 may acquire time series data of the temperature, current, or voltage of the battery 40, and store it in the storage part 170. The acquisition part 110 may perform processing of excluding data in which loss or abnormality has occurred among the acquired time series data. The time series data of the SOC, like the controller 36, may be calculated based on functions of the voltage and the SOC and the time series data of the voltage. The time series data of the SOC, like the controller 36, may be calculated based on functions of the voltage, current, temperature, and SOC, and the time series data of the voltage, current, and temperature. FIG. 3 is an example of the time series data of the SOC.

The segmentation part 120 divides the time series data of the SOC into segment data for each segment. The segmentation part 120 divides the time series data into segment data by, for example, the following method. First, the segmentation part 120 sets a SOC value at a certain time point as a reference value. The reference value is, for example, an initial value, which is a SOC value at a time 0 in the time series data.

Figure 4:
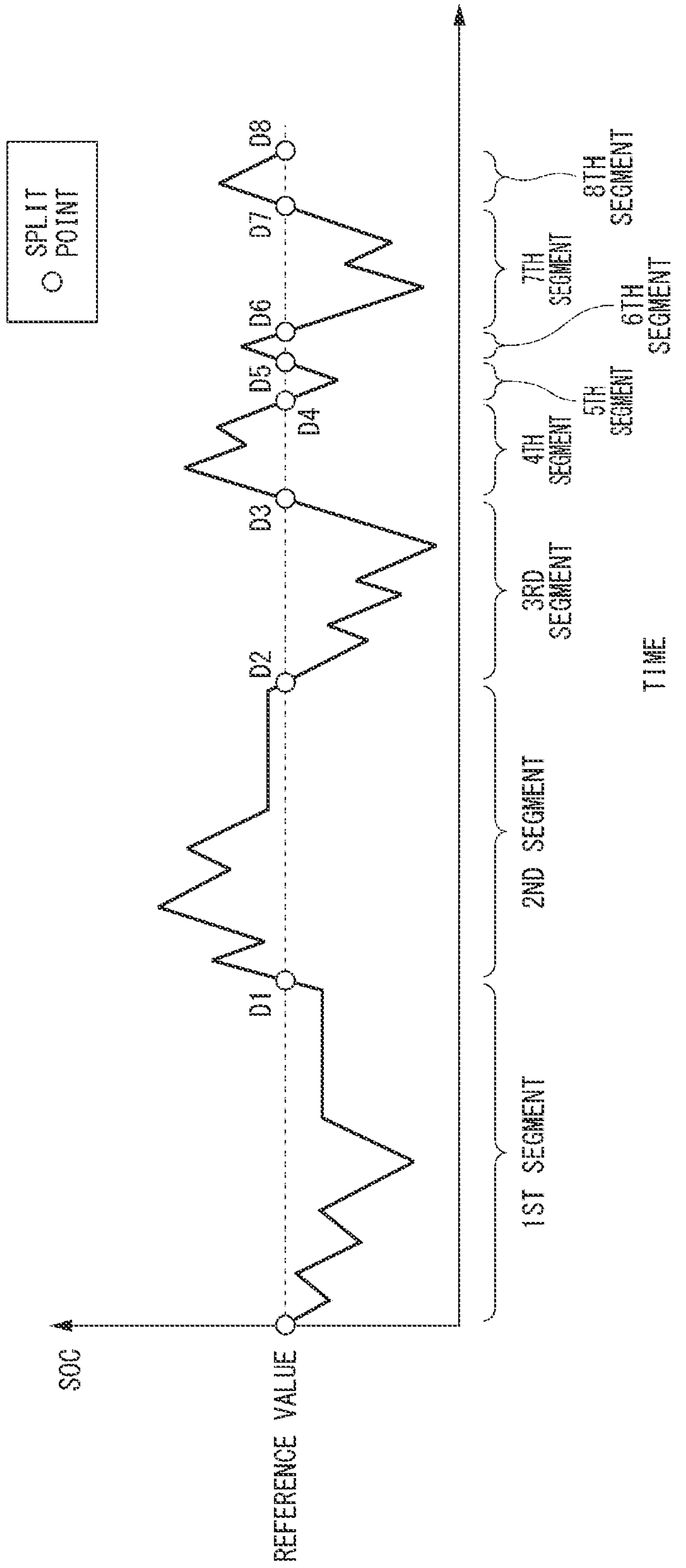
FIG. 4 is an example of divided time series data.

After that, the segmentation part 120 identifies a time point at which data of the time series data has the same value as a reference value as a division point D. After that, the segmentation part 120 divides the time series data by the division point. FIG. 4 is an example of divided time series data. The division points are set to a first division point D1, a second division point D2, and so on in a descending order of time. The segmentation part 120 sets data between the reference value and the first division point D1 among the time series data as first segment data. The segmentation part 120 sets data between the first division point D1 and the second division point D2 among the time series data as second segment data. With the processing as above, the time series data is divided into segment data.

When $n^{th}$ segment data (n is an odd number) is data smaller than the reference value, $m^{th}$ segment data (m is an even number) is data larger than the reference value. When the $n^{th}$ segment data (n is an odd number) is data larger than the reference value, the $m^{th}$ segment data (m is an even number) is data smaller than the reference value. For example, when the first segment data takes a value smaller than the reference value, the time series data changes from a value smaller than the reference value to a value larger than the reference value at the first division point, and thus the second segment data takes a value larger than the reference value. For example, when the first segment data takes a value larger than the reference value, the time series data changes from a value larger than the reference value to a value smaller than the reference value at the first division point, and thus the second segment data takes a value smaller than the reference value. The segmentation part 120 stores the divided segment data in the storage part 170 as the segment data 170B.

The pulse extraction part 130 extracts a pulse from segment data. The pulse extraction part 130 extracts a pulse from segment data by, for example, the following method. First, the pulse extraction part 130 identifies a point at which the slope changes in the segment data as a change point. The pulse extraction part 130 identifies, among change points, a point at which an increasing difference from the reference value turns to a decreasing difference from the reference value as a first vertex of the pulse. For example, when the segment data is data smaller than the reference value, the pulse extraction part 130 identifies a time point at which a magnitude of the slope turns from negative to positive as the first vertex of the pulse. For example, when the segment data is data larger than the reference value, the pulse extraction part 130 identifies, among the change points, a time point at which the magnitude of the slope turns from positive to negative as the first vertex of the pulse.

After that, the pulse extraction part 130 identifies, among the first vertices of the pulse, a vertex of the pulse with a largest difference between the value and the reference value as a first vertex B1 of the large pulse. For example, when the segment data is data smaller than the reference value, the pulse extraction part 130 identifies a pulse with a smallest SOC value as the first vertex B1 of the large pulse. For example, when the segment data is data larger than the reference value, the pulse extraction part 130 identifies a pulse with the largest SOC value as the first vertex B1 of the large pulse. The pulse extraction part 130 identifies the first vertex of the pulse that is not the first vertex B1 of the large pulse as a first vertex S1 of the small pulse. That is, the pulse extraction part 130 extracts one large pulse and (n−1) small pulses from segment data when the first vertices of n (n is an integer equal to or greater than 1) pulses are identified in the segment data.

The pulse extraction part 130 identifies two points where two lines with different slopes intersecting at the first vertex B1 of the large pulse intersect with a line indicating the reference value as a second vertex B2 and a third vertex B3 of the large pulse. The pulse extraction part 130 identifies a triangle formed from the first vertex B1, the second vertex B2, and the third vertex B3 of the large pulse as the large pulse.

Figure 5:
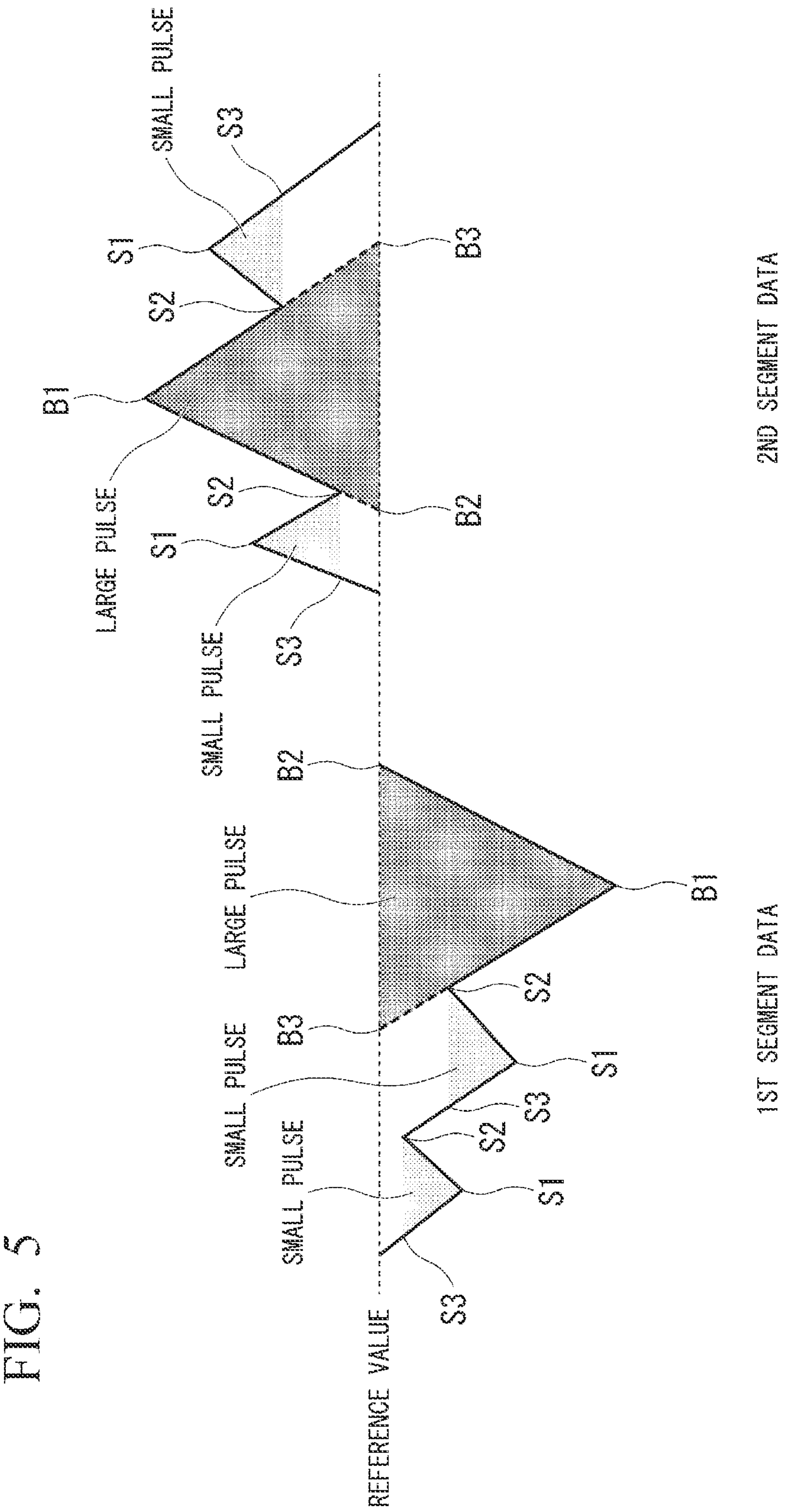
FIG. 5 is a diagram which shows a large pulse and a small pulse extracted from each of first segment data and second segment data.

The pulse extraction part 130 identifies a point at which a difference between the value and the reference value is large, among change points adjacent to the first vertex S1 of the small pulse, as the second vertex S2 of the small pulse. When the first vertex S1 of the small pulse is adjacent to a change point and a division point, the pulse extraction part 130 identifies the change point as the second vertex of the small pulse. After that, the pulse extraction part 130 identifies a point having the same value as the second vertex S2 of the small pulse on a line that does not include the second vertex S2 of the small pulse, among the two lines that intersect at the first vertex S1 of the small pulse, as the third vertex S3 of the small pulse. The pulse extraction part 130 identifies a triangle formed from the first vertex S1, the second vertex S2, and the third vertex S3 of the small pulse as the small pulse. FIG. 5 is a diagram which shows a large pulse and a small pulse extracted from the first segment data and the second segment data, respectively. The pulse extraction part 130 stores the extracted pulses in the storage part 170 as the pulse data 170C.

Processing of the pulse extraction part 130 described above is an example. The pulse extraction part 130 only needs to be able to extract the large pulse and the small pulse from segmented data, and a processing procedure is not limited to the processing described above.

The pulse characteristic value calculation part 140 calculates pulse characteristic values from each pulse. The pulse characteristic values include, for example, the amount of change in SOC (ΔSOC), a median value of the SOC, a current value during charging, and a current value during discharging. The pulse characteristic values are calculated by the following method.

ΔSOC is the difference between maximum and minimum values that a pulse can take. That is, if the pulse is a large pulse, it is a difference between an SOC value serving as the first vertex B1 of the large pulse and an SOC value serving as the second vertex B2 or the third vertex B3 of the large pulse. If it is a small pulse, it is a difference between an SOC value serving as the first vertex S1 of the small pulse and an SOC value serving as the second vertex S2 or third vertex S3 of the small pulse.

A median value of the SOC is a median value between the maximum and minimum values that a pulse can take. That is, if the pulse is a large pulse, it is the median value of an SOC value serving as the first vertex B1 of the large pulse and an SOC value serving as the second vertex B2 or the third vertex B3 of the large pulse. If the pulse is a small pulse, it is the median value of an SOC value serving as the first vertex S1 of the small pulse and an SOC value serving as the second vertex S2 or third vertex S3 of the small pulse.

The current value during charging is a slope of a line with a positive slope among lines surrounding a pulse. The current value during discharge is a slope of a line with a negative slope among the lines surrounding a pulse.

The pulse characteristic value calculation part 140 stores the calculated pulse characteristic values in the storage part 170 as the pulse characteristic value data 170D.

The pulse characteristic values may include the temperature of the battery 40. The pulse characteristic value calculation part 140 may calculate the temperature included in the pulse characteristic values based on the temperature at a time when a pulse acquired from the time series data of the temperature can take. The pulse characteristic value calculation part 140 may calculate, for example, an average value, a maximum value, or a minimum value of the temperature at the time when the pulse can take as the temperature included in the pulse characteristic values. FIG. 6 is an example of a table showing the pulse characteristic values.

The histogram creation part 150 creates a histogram based on the pulse characteristic value. The histogram creation part 150 divides, for example, ΔSOC, which is the pulse characteristic value, the median value of the SOC, the current value during charging, the current value during discharging, and the temperature into classes, and creates a frequency distribution of each pulse. The histogram creation part 150 may create the frequency distribution of a large pulse and may create the frequency distribution of a small pulse. The histogram creation part 150 stores the created histogram in the storage part 170 as the histogram data 170E.

The degradation estimation part 160 estimates a degradation state of the battery 40 based on the histogram. The degradation estimation part 160 estimates the degradation state of the battery 40 by, for example, applying the created histogram to a pattern.

The output part 180 outputs data related to the estimated degradation state. The output part 180 may output data stored in storage part 170.

Figure 7:
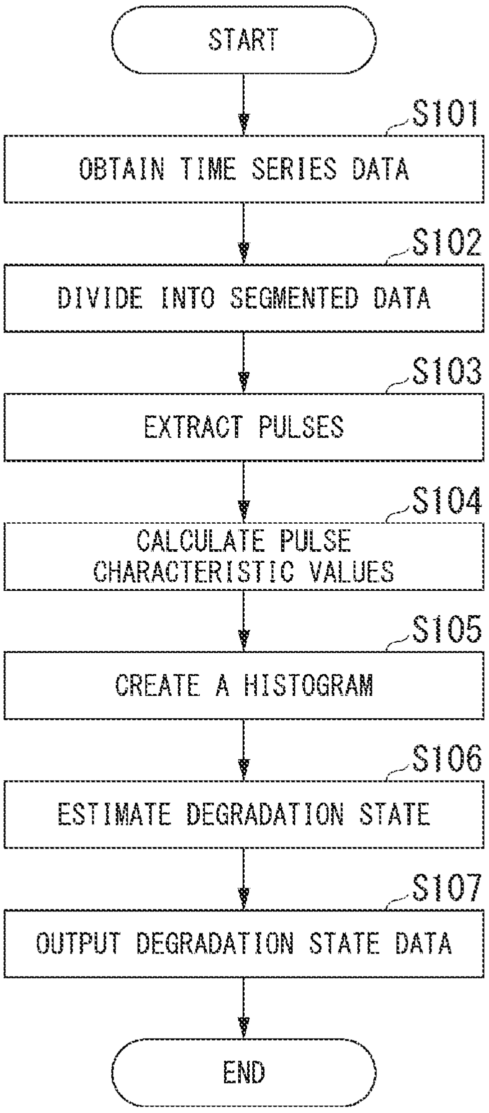
FIG. 7 is a flowchart which shows an operation of the pulse extraction device 100.

FIG. 7 is a flowchart which shows an operation of the pulse extraction device 100. First, the acquisition part 110 acquires time series data from the communication device 50 (step S101). The segmentation part 120 divides the time series data of the SOC into segment data (step S102). The pulse extraction part 130 extracts a pulse from the segment data (step S103). The pulse characteristic value calculation part 140 calculates the pulse characteristic values of each pulse (step S104). The histogram creation part 150 creates a histogram based on the pulse characteristic values (step S105). The degradation estimation part 160 estimates the degradation state of the battery 40 based on the histogram (step S106). The output part 180 outputs data related to the degradation state (step S107).

According to the embodiment described above, the pulse extraction device 100 extracts a pulse based on a change point at which an increase or decrease changes in time series data of a charge amount of the secondary battery, and thereby it is possible to finely divide a waveform representing the charge amount.

The embodiment described above can be expressed as follows.

A battery feature amount extraction device is configured to include a storage device that has stored a program, and a hardware processor, in which the hardware processor executes a program stored in the storage device, thereby acquiring time series data of a charge amount of a secondary battery, and extracting a pulse based on a change point at which an increase or decrease changes in the time series data.

As described above, a mode for implementing the present invention has been described using the embodiments, but the present invention is not limited to such embodiments at all, and various modifications and replacements can be added within a range not departing from the gist of the present invention.

EXPLANATION OF REFERENCES

10 Vehicle
12 Motor
14 Drive wheel
16 Brake device
20 Vehicle sensor
30 PCU
32 Converter
34 VCU
36 Controller
40 Battery
42 Battery sensor
50 Communication device
100 Pulse extraction device
110 Acquisition part
120 Segmentation part
130 Pulse extraction part
140 Pulse characteristic value calculation part
150 Histogram creation part
160 Degradation estimation part
170 Storage part
180 Output part

What is claimed is:

1. A pulse extraction device comprising:

a memory that stores a program; and a processor that, upon execution of the program, is configured to operate as:

a pulse extraction part configured to extract a pulse defined by a triangle comprising: a first vertex at which an increasing difference from a reference value turns to a decreasing difference from the reference value, a second vertex, and a third vertex, the second vertex and the third vertex are two points where two lines with different slopes intersecting at the first vertex intersect with a line indicating a predetermined value based on time series data of a charge amount of a secondary battery;

a pulse characteristic value calculation part configured to calculate pulse characteristic values based on the extracted pulse;

a histogram creation part configured to create a histogram based on the pulse characteristic value;

a degradation estimation part configured to estimate a degradation state of the secondary battery based on the histogram, and an output part configured to output data related to the estimated degradation state, wherein the pulse extraction part identifies, among the first vertices of the pulse, a point at which a difference from the reference value is the largest as a first vertex of a large pulse and identifies the vertices of the pulse other than the first vertex of the large pulse as first vertices of a small pulse.

2. The pulse extraction device according to claim 1, wherein the processor is further configured to operate as:

a segmentation part configured to divide the time series data for each segment based on a reference value of the charge amount, wherein the pulse extraction part extracts a pulse for each segment.

3. The pulse extraction device according to claim 2, wherein the pulse characteristic values include a current value during charging of the secondary battery, a current value during discharging, an amount of change in charge amount, and a median value of the charge amount.

4. The pulse extraction device according to claim 1, wherein the second vertex and the third vertex of the large pulse are the two points where the two lines intersecting at the first vertex of the large pulse intersect with the line indicating the reference value.

5. The pulse extraction device according to claim 4, wherein the pulse characteristic values include a current value during charging of the secondary battery, a current value during discharging, an amount of change in charge amount, and a median value of the charge amount.

6. The pulse extraction device according to claim 1, wherein the second vertex of the small pulse is the point, among change points where a rate of increase or decrease changes and which are adjacent to the first vertex of the small pulse, at which the difference from the reference value is large, and the third vertex of the small pulse is the point, among the two lines that intersect at the first vertex of the small pulse, on the line that does not contain the second vertex of the small pulse and the value is equal to that of the second vertex of the small pulse.

7. The pulse extraction device according to claim 6, wherein the pulse characteristic values include a current value during charging of the secondary battery, a current value during discharging, an amount of change in charge amount, and a median value of the charge amount.

8. The pulse extraction device according to claim 1, wherein the pulse characteristic values include a current value during charging of the secondary battery, a current value during discharging, an amount of change in charge amount, and a median value of the charge amount.

9. A pulse extraction method comprising:

a pulse extraction step of extracting a pulse defined by a triangle comprising: a first vertex at which an increasing difference from a reference value turns to a decreasing difference from the reference value, a second vertex, and a third vertex, the second vertex and the third vertex are two points where two lines with different slopes intersecting at the first vertex intersect with a line indicating a predetermined value based on time series data of a charge amount of a secondary battery;

a pulse characteristic value calculation step of calculating pulse characteristic values based on the extracted pulse;

a histogram creation step of creating a histogram based on the pulse characteristic value;

a degradation estimation step of estimating a degradation state of the secondary battery based on the histogram, and an output part configured to output data related to the estimated degradation state, and wherein the pulse extraction step identifies, among the first vertices of the pulse, a point at which a difference from the reference value is the largest as a first vertex of a large pulse and identifies the vertices of the pulse other than the first vertex of the large pulse as first vertices of a small pulse.

10. A non-transitory computer-readable storage medium storing a program which causes a computer to execute:

extracting a pulse defined by a triangle comprising: a first vertex at which an increasing difference from a reference value turns to a decreasing difference from the reference value, a second vertex, and a third vertex, the second vertex and the third vertex are two points where two lines with different slopes intersecting at the first vertex intersect with a line indicating a predetermined value based on time series data of a charge amount of a secondary battery, calculating pulse characteristic values based on the extracted pulse, creating a histogram based on the pulse characteristic value, estimating a degradation state of the secondary battery based on the histogram, and outputting data related to the estimated degradation state, and wherein the extracting the pulse identifies, among the first vertices of the pulse, a point at which a difference from the reference value is the largest as a first vertex of a large pulse and identifies the vertices of the pulse other than the first vertex of the large pulse as first vertices of a small pulse.

* * * * *